United States Patent [19]

Hamajima et al.

[11] Patent Number: 4,924,123
[45] Date of Patent: May 8, 1990

[54] LINEAR GENERATOR

[75] Inventors: Takanori Hamajima, Aichi; Yukio Inaguma, Nagoya, both of Japan

[73] Assignees: Aisin Seiki Kabushiki Kaisha, Kariya; Kabushiki Kaisha Toyota Chuo Kenkyusho, Aichi, both of Japan

[21] Appl. No.: 285,666

[22] Filed: Dec. 16, 1988

[30] Foreign Application Priority Data

Dec. 18, 1987 [JP] Japan .................. 62-318506

[51] Int. Cl.$^5$ ............................................ H02K 35/02
[52] U.S. Cl. ........................................ 310/15; 310/190
[58] Field of Search ................. 310/190, 191, 209, 12, 310/15, 30; 322/3; 290/1 R

[56] References Cited

U.S. PATENT DOCUMENTS

| | | | |
|---|---|---|---|
| 4,347,457 | 8/1982 | Sakamoto | 310/256 |
| 4,349,757 | 9/1982 | Bhate | 310/15 |
| 4,403,153 | 9/1983 | Vallon | 290/1 R |
| 4,454,426 | 6/1984 | Benson | 290/1 R |
| 4,500,827 | 2/1985 | Merritt et al. | 322/3 |
| 4,602,174 | 7/1986 | Redlich | 310/15 |
| 4,623,808 | 11/1986 | Beale et al. | 310/15 |

Primary Examiner—Patrick R. Salce
Assistant Examiner—Judson H. Jones
Attorney, Agent, or Firm—Oblon, Spivak, McClelland, Maier & Neustadt

[57] ABSTRACT

A linear generator according to the present invention is adapted to generate a voltage proportional to the speed of a movable member or rotor and enable the movable member to be smoothly moved. The linear generator includes a first part having permanent magnets fixed to a yoke which are magnetized to the direction perpendicular to the longitudinal direction of a shaft, and a second part having a coil wound around the bobbins and a housing enclosing the coil. A plurality of magnetic poles are provided between the magnets and coils.

11 Claims, 2 Drawing Sheets

LINEAR GENERATOR

BACKGROUND OF THE INVENTION

1. Field of the Invention

The present invention relates to a linear generator adapted to generate a voltage proportional to the speed of a movable member or rotor and enable the movable member to be smoothly moved.

2. Statement of Prior Art

As disclosed in U.S. Pat. No. 4,500,827, a linear generator according to a prior art is constituted in such a way that a yoke and permanent magnets are fixedly mounted to a reciprocating shaft to provide a movable member or rotor, and magnetic poles, bobbins and coils are disposed oppositely to said permanent magnets to provide a stator. In this instance, the length of one permanent magnet is selected to become half of the stroke of a shaft, and the respective magnets are spaced by the distance corresponding to the stroke of the shaft and juxtaposed with different polarities. The width of the magnetic poles and the coils is made equivalent to that of the permanent magnets.

The magnetic resistance in relation to a permanent magnet is the smallest one when the permanent magnet is displaced to the position opposite or facing the magnetic pole and the largest one when the permanent magnet is displaced to the position opposite or facing to the coil. Accordingly, as explained above, the arrangement of the permanent magnet, the magnetic pole and the coil according to a prior art causes the magnetic resistance to vary remarkably depending on the displacement of the permanent magnet and also causes the magnetic energy being stored in the air gap defined between the permanent magnet and the magnetic pole to vary so considerably that a big cogging force will be generated. The term "cogging force" is used herein to express thrust at the time of unloading. Consequently, the peak of the force for driving the movable member or rotor is so high that a driving source for high thrust will be necessitated.

The present invention has therefore as the subject to solve to eliminate the drawbacks caused by the prior art as above explained.

SUMMARY OF THE INVENTION

In order to solve the above-mentioned problems in the prior art, the present invention provides a linear generator comprising a first part which has a yoke fixed to a shaft and a plurality of permanent magnets substantially contacting to the longitudinal direction of said shaft and fixed to the surface of said yoke and in which said permanent magnets are magnetized to the direction perpendicular to the longitudinal direction of said shaft and each of adjacent permanent magnets has a polarity opposite to each other; and a second part which has a plurality of magnetic poles facing opposedly to said permanent magnets with clearance therebetween, coils wound around the bobbins made of non-magnetic material and a housing enclosing said coils, wherein said plurality of magnetic poles being provided between said permanent magnet and said coils.

The magnetic path of the magnetic flux generated by the permanent magnets is varied depending on the relative displacement of the first part and the second part and the amount of the magnetic flux interlinked relative to the coils is also varied, thereby resulting in voltage on the coils. And voltage proportional to the relative displacement velocity or speed of the first part and second part is obtained, so that when the generator is driven in the speed having a sinusoidal shape, excellent alternate current output without any deformation may be obtained. It is also to be noted that the movable member may be operated smoothly and the maximum thrust at the driving source may, become smaller. The acompanying drawings illustrate the embodiment of the invention and together with the description serve to explain the principles of the invention.

DESCRIPTION OF THE PREFERRED EMBODIMENT OF THE INVENTION

Figure 1:
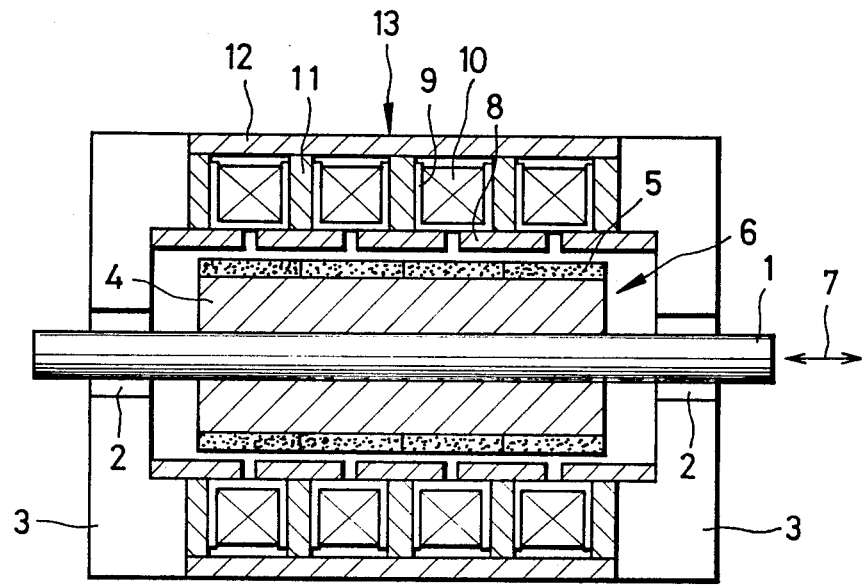
FIG. 1 is the sectional view showing an embodiment of the present invention.
Figure 2:
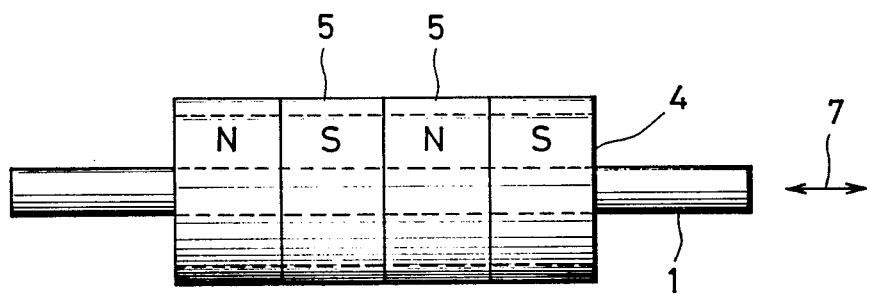
FIG. 2 is the side elevation of the movable member.

Firstly, reference is made to FIG. 1 wherein the shaft 1 connected to the reciprocating rod of a stirling engine not shown is supported by the holder 3 through bearings 2. The shaft 1, the bearings 2 and the holder 3 are made of non-magnetic bodies. A plurality of permanent magnets 5 are juxaposed to the shaft 1 through the yoke 4 made of magnetic material. Said shaft 1, said yoke 4 and said permanent magnets 5 constitute the movable member 6. The length of each one permanent magnet 5 is selected to be equal to the stroke 7 of linear reciprocation of the movable member 6 and the permanent magnets are arranged in a manner to tightly contact with each other and the polarity of each adjacent permanent magnet is opposite to each other.

A plurality of magnetic poles 8 are so disposed that they are spaced from but facing oppposedly to said permanent magnets. The number of the magnetic poles 8 is more than that of the permanent magnets 5 by one. And the overall length of the permanent magnet 5 is shorter by the reciprocation stroke of the movable member 6 than the overall length of the magnetic poles 8. The small clearances defined between each magnetic pole 8 will be located substantially at central position of each permanent magnet 5 when the generator is at the neutral position and the opposite ends of each permanent magnet 5 is located substantially at the central position of each magnetic pole 8. The length of each magnetic pole 8 is selected to be 80% to 95% of that of each permanent magnet. Consequently, while the movable member 6 is reciprocating, the permanent magnets 5 are moved always oppositely facing to the magnetic poles 8, so that the magnetic resistance between the permanent magnets 5 and the magnetic poles 8 is kept constant and variation of the magnetic energy stored in the air gap is also so small that cogging force is likewise small.

Coils 10 are disposed outwardly of the magnetic poles 8 through bobbins 9. Said coils 10 are arranged opposedly to said permanent magnets 5 and yokes 11 are arranged in between the coils. A housing 12 is provided outside of said yokes 11 to define the outer configuration of the generator together with the holders 3. The magnetic poles 8, the yokes 11, the coils 10 and the housing 12 constitutes the stator 13. It is to be noted that the stator 13 is made of magnetic material except the bobbins 9.

Figure 3:
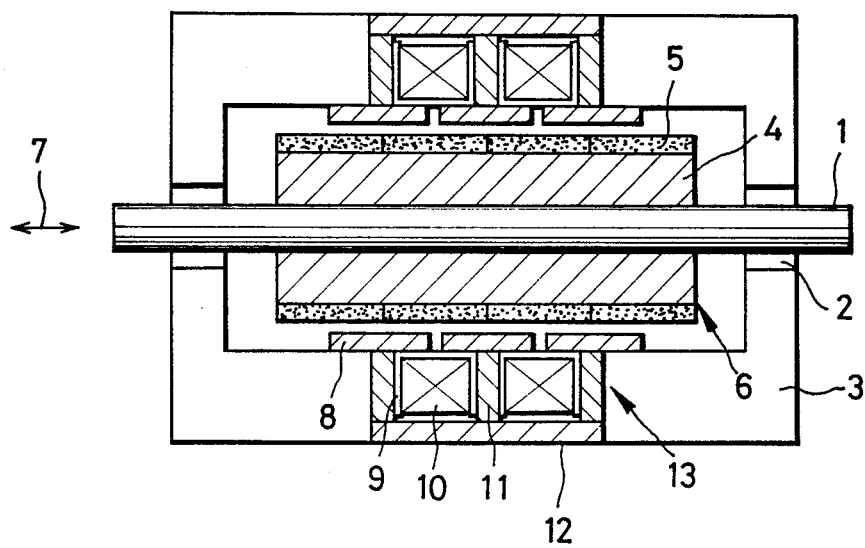
FIG. 3 is the sectional view showing another embodiment of the present invention.

In FIG. 3, there is shown another embodiment of the present invention. In the embodiment as shown in FIG. 3, the constitution is identical to that of FIG. 1 except that the overall length of the permanent magnets 5 is made longer than the overall length of the magnetic poles 8 by the stroke 7 of reciprocation of the movable member 6 and there is such a case as a permanent magnet 5 will not face oppositely to a magnetic pole 8 while the movable member 6 is reciprocating. As such, the explanation of the constitution of said embodiment will not be repeated here. According to this embodiment, since there are such cases as a permanent magnet 5 will not face oppositely to a magnetic pole 8 during operation of the generator, and the magnetic resistance will vary, so that the magnetic energy will also vary and cogging force will be generated. This cogging force has such a tendency as to be concentrated toward the center of the shaft 1 and exhibits the same characteristics as a spring. Therefore, the embodiment shown in FIG. 3 makes use of the spring effect and performs two functions, that is, power generation and spring effect.

Figure 4:
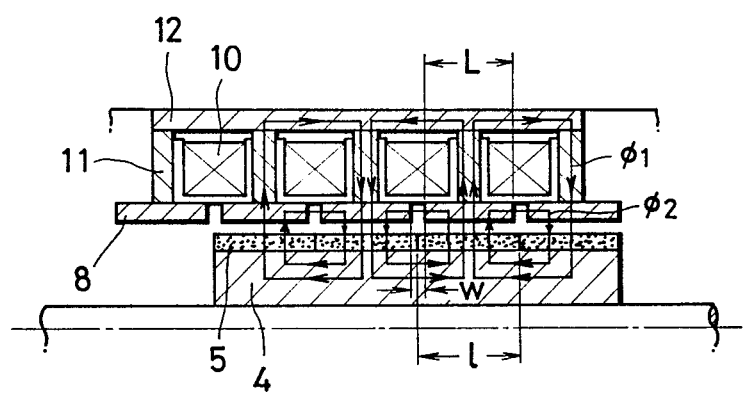
FIG. 4 is the partial sectional view showing the relative dimensions of the respective components.

As it is clear from disclosure of the embodiments as above explained, the linear generator according to the present invention is characterized in such a constitution as "(1) The permanent magnets 5 are disposed with each adjacent permanent magnet having an opposite polarity. (2) The width 'L' of the magnetic pole oppositely facing to the permanent magnet is made as wide as possible as shown in FIG. 4." In this instance, when the permanent magnets 5 as the movable member come to the position facing oppositely to the magnetic poles 8, the magnetic flux $\phi$ generated by the permanent magnets is divided into the composition $\phi_1$ interlinked on the coils 10 and the composition $\phi_2$ flowing directly to the adjacent magnetic poles. Since the magnetic flux which can be effectively used for generation is the composition $\phi_1$ and the composition $\phi_2$ will cause magnetic saturation of the iron core, generate useless thrust for the movable member and so forth, it is necessary to keep the magnetic force at a low level. When the width 'L' of the magnetic poles 8 is too widened, $\phi_2$ will be increased due to reduction of the magnetic resistance between said width 'W'. And if the width W becomes null, majority of the flux $\phi$ will become $\phi_2$, so that the performance of the generator will become poor. If the width 'L' will be shortened so as to restrict generation of $\phi_2$, then the characteristic (2) as above mentioned will be contradicted and the undesirable cogging force will be increased. In view of this, if the performance of the generator is set with $\phi_2/\phi_1 \leqq 0.4$, then W/L will be 0.05-0.20 or preferably 0.1-0.15. In this preferable range, the cogging force may be kept less than 10% of the looding thrust. On the other hand, if W/L is 0.3, then the cogging force will increase to the order of 50%. Therefore W/L should be kept less than 0.20.

According to the present invention, voltage proportional to the velocity of the movable member will be obtained, so that the generator may be used also as a speed sensor. Furthermore, since magnets may be disposed entirely on the surface of the movable member, the output per unit volume and mass may be increased.

It will be apparent to those skilled in the art that various modifications can be made within the scope of the appended claims and their equivalents.

What is claimed is:

1. A linear generator comprising a first part which has a yoke fixed to a shaft and a plurality of permanent magnets substantially positioned along the longitudinal direction of said shaft and fixed to the surface of said yoke and in which said permanent magnets are magnetized in the direction perpendicular to the longitudinal direction of said shaft and each of adjacent permanent magnets has a polarity opposite to each other; and a second part which has a plurality of magnetic poles facing oppositely to said permanent magnets with clearance between said poles and said permanent magnets and said poles are spaced from each other by a specified distance therebetween, coils wound around bobbins made of non-magnetic material and a housing enclosing said coils, wherein said plurality of magnetic poles are provided between said permanent magnet and said coils.

2. A linear generator as claimed in claim 1, wherein the longitudinal length of each magnetic pole is shorter than that of each permanent magnet by said clearance between said magnetic poles.

3. A linear generator as claimed in claim 1, wherein the area of the opposed surface of said magnetic poles to said permanent magnet is substantially constant in accordance with reciprocation of first part and second part.

4. A linear generator as claimed in claim 1, wherein said clearance between said magnetic poles is opposed to said coils.

5. A linear generator as claimed in claim 1, wherein the number of the permanent magnets is less than that of the magnetic poles, and the overall length of the permanent magnets is shorter than that of the magnetic poles by the stroke of reciprocation of one part relative to the other part, so that the permanent magnets are always facing oppositely to the magnetic poles.

6. A linear generator as claimed in claim 1, wherein the number of permanent magnets is more than that of the magnetic poles and the overall length of the permanent magnet is longer than the overall length of the magnetic poles at least by the stroke of reciprocation of one part relative to the other part, so that a part of the permanent magnets will not face oppositely to the magnetic poles.

7. A linear generator as claimed in claim 3, wherein said shaft is connected to the rod fixed to the piston of a stirling engine.

8. A linear generator as claimed in claim 4, wherein the respective clearance between said spaced magnetic poles is located opposedly facing substantially to the central portion of the respective permanent magnets when the generator is in a neutral position.

9. A linear generator as claimed in claim 1, wherein said shaft is reciprocated with a substantially constant stroke, said first part constitutes the movable member and said second part constitutes the stator.

10. A linear generator as claimed in claim 1, wherein the ratio of the distance spacing the respective magnetic poles in the longitudinal direction to the width of the surface of the respective magnetic poles facing oppositely to the permanent magnets is 0.05 to 0.2.

11. A linear generator comprising a first part which has a yoke fixed to a shaft and a plurality of permanent magnets fixed to the outer surface of said yoke and in which said permanent magnets are magnetized in the direction perpendicular to the longitudinal direction of said shaft and each of adjacent permanent magnets has a polarity opposite to each other; and a second part which has a plurality of magnetic poles facing oppositely to said permanent magnets with clearance between said poles and said permanent magnets and said poles are spaced from each other by a specified distance therebetween, coils located outside of said magnetic poles and wound around the bobbins made of non-magnetic material and a housing enclosing said coils, wherein at least one of said first and second parts has a means for minimizing the change of opposed area of said magnetic poles and said permanent magnets.

* * * * *